(12) United States Patent
Augustinowicz et al.

(10) Patent No.: US 7,635,089 B2
(45) Date of Patent: Dec. 22, 2009

(54) DEVICE FOR SHIELDING READING OF A CONTACTLESS SMARTCARD

(75) Inventors: Walt Augustinowicz, Englewood, FL (US); Robert Brady, Sarasota, FL (US); Dave Prager, Sarasota, FL (US); Eric Buffkin, Newberry, FL (US); Jeff Nichols, Sarasota, FL (US)

(73) Assignee: Identity Stronghold, LLC, Englewood, FL (US)

( * ) Notice: Subject to any disclaimer, the term of this patent is extended or adjusted under 35 U.S.C. 154(b) by 91 days.

(21) Appl. No.: 11/612,924

(22) Filed: Dec. 19, 2006

(65) Prior Publication Data

US 2008/0000987 A1 Jan. 3, 2008

Related U.S. Application Data

(60) Provisional application No. 60/806,509, filed on Jul. 3, 2006, provisional application No. 60/827,962, filed on Oct. 3, 2006.

(51) Int. Cl.
*G06K 7/00* (2006.01)
*G09F 3/20* (2006.01)

(52) U.S. Cl. .................. 235/486; 235/492; 40/649; 40/652

(58) Field of Classification Search ................ 235/382, 235/451, 486, 487, 492; 340/572.1–572.9; 40/1.5, 124.06; 206/307, 387.13, 37, 39, 206/39.1, 39.4, 39.5, 39.6, 39.7
See application file for complete search history.

(56) References Cited

U.S. PATENT DOCUMENTS

| | | | |
|---|---|---|---|
| 4,647,714 A | 3/1987 | Goto | |
| 5,125,505 A * | 6/1992 | Kurosaki | 206/39.4 |
| 6,121,544 A | 9/2000 | Petsinger | |
| 6,127,938 A * | 10/2000 | Friedman | 340/693.6 |
| 6,155,410 A * | 12/2000 | Davis | 206/39.5 |
| 6,845,863 B1 * | 1/2005 | Riley | 206/39 |
| 6,876,552 B2 * | 4/2005 | Pan et al. | 361/730 |
| 7,083,083 B2 * | 8/2006 | Droz | 235/375 |
| 7,243,840 B2 * | 7/2007 | Bason et al. | 235/492 |
| 2002/0071212 A1 * | 6/2002 | Rogers | 360/132 |
| 2004/0148837 A1 * | 8/2004 | Lewis | 40/654.01 |
| 2005/0183579 A1 * | 8/2005 | Bowers | 99/279 |
| 2005/0236489 A1 | 10/2005 | Droz | |
| 2006/0017570 A1 * | 1/2006 | Moskowitz et al. | 340/572.7 |
| 2006/0027593 A1 * | 2/2006 | Slocum | 221/232 |
| 2007/0157494 A1 * | 7/2007 | Barcikowski | 40/1.5 |

* cited by examiner

*Primary Examiner*—Seung H Lee
*Assistant Examiner*—Christle I Marshall
(74) *Attorney, Agent, or Firm*—GrayRobinson, PA

(57) ABSTRACT

A device is provided for shielding a contactless smartcard or RFID tag from reading. The device can include a first panel for holding and presenting a contactless smartcard, a second panel comprising a shielding material that prevents unauthorized reading of information when the contactless smartcard is in proximity to or resting on the second panel, and a hinge coupling the first panel and the second panel. The hinge keeps the device closed for preventing unauthorized reading, and open when a force is applied for allowing authorized reading. The contactless smartcard can be inserted between the first panel and the second panel.

11 Claims, 13 Drawing Sheets

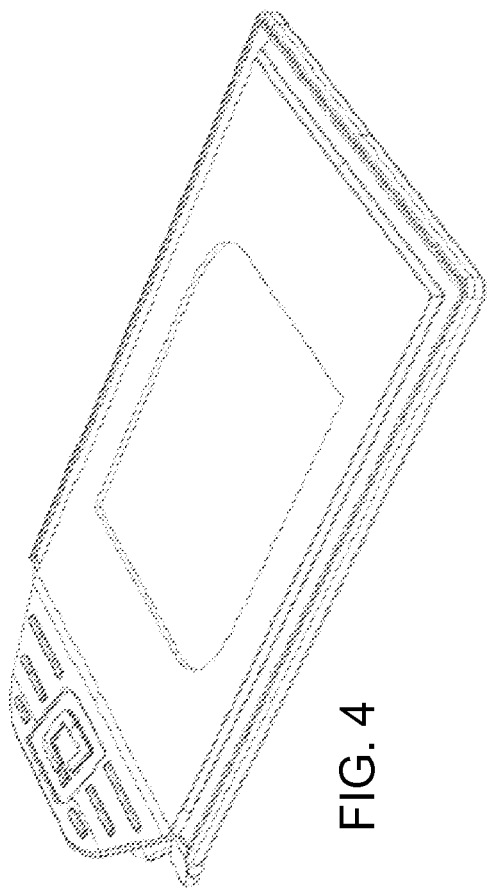
FIG. 4
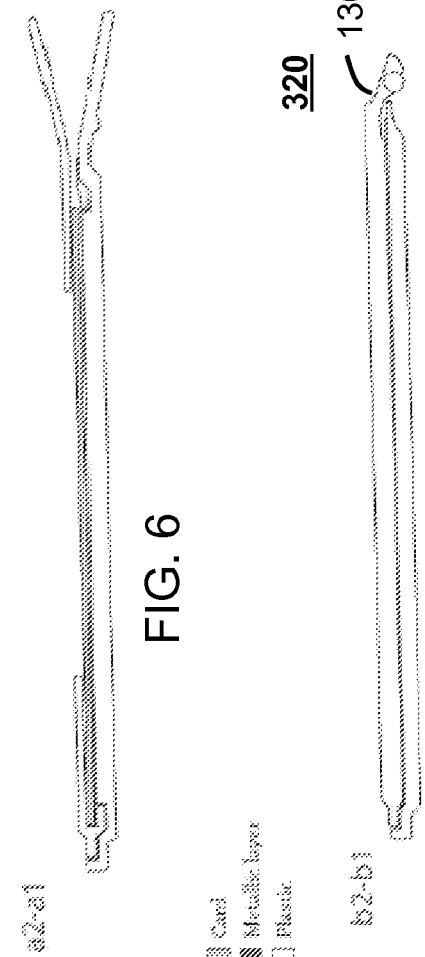
FIG. 6
FIG. 7
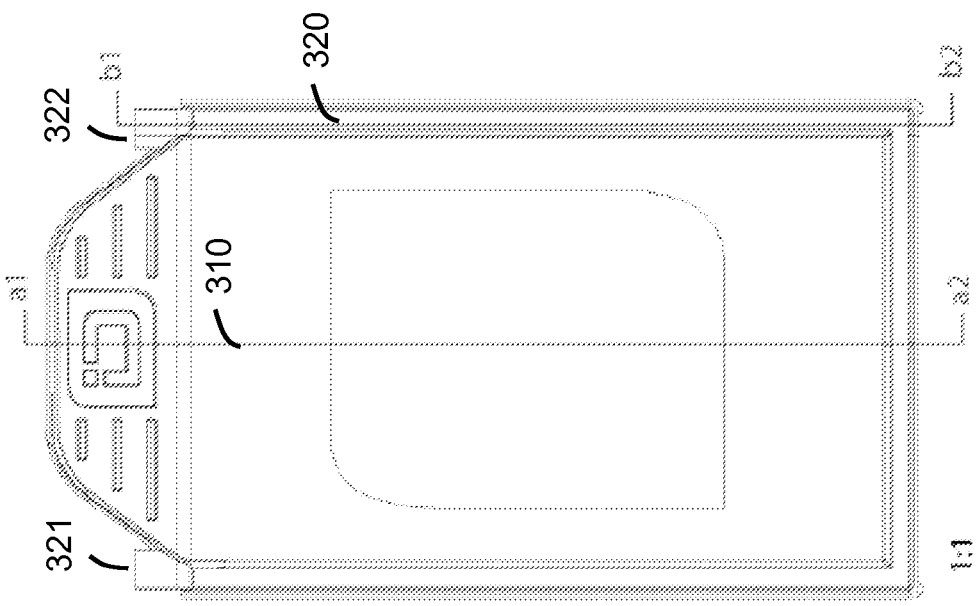
FIG. 5

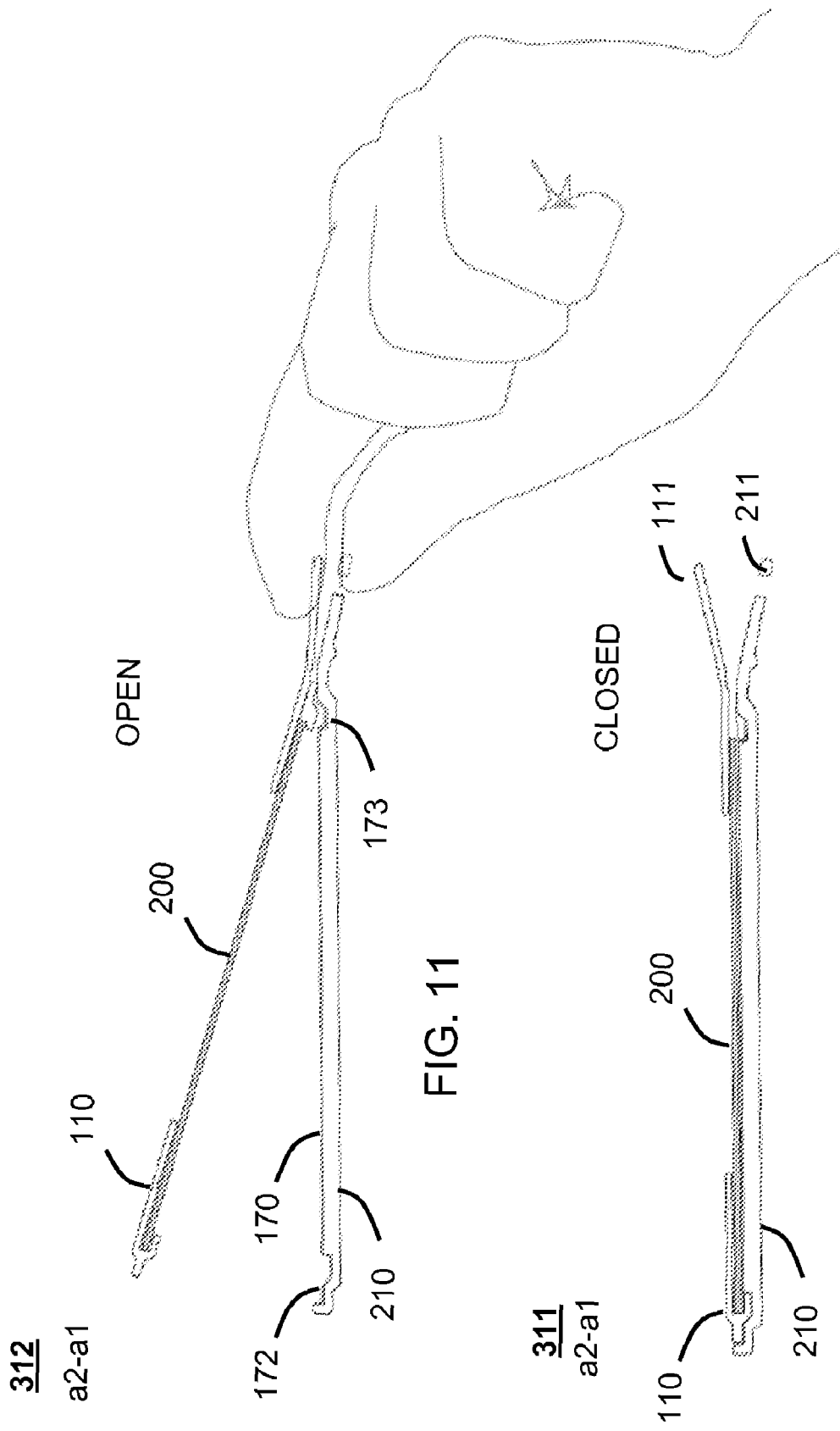

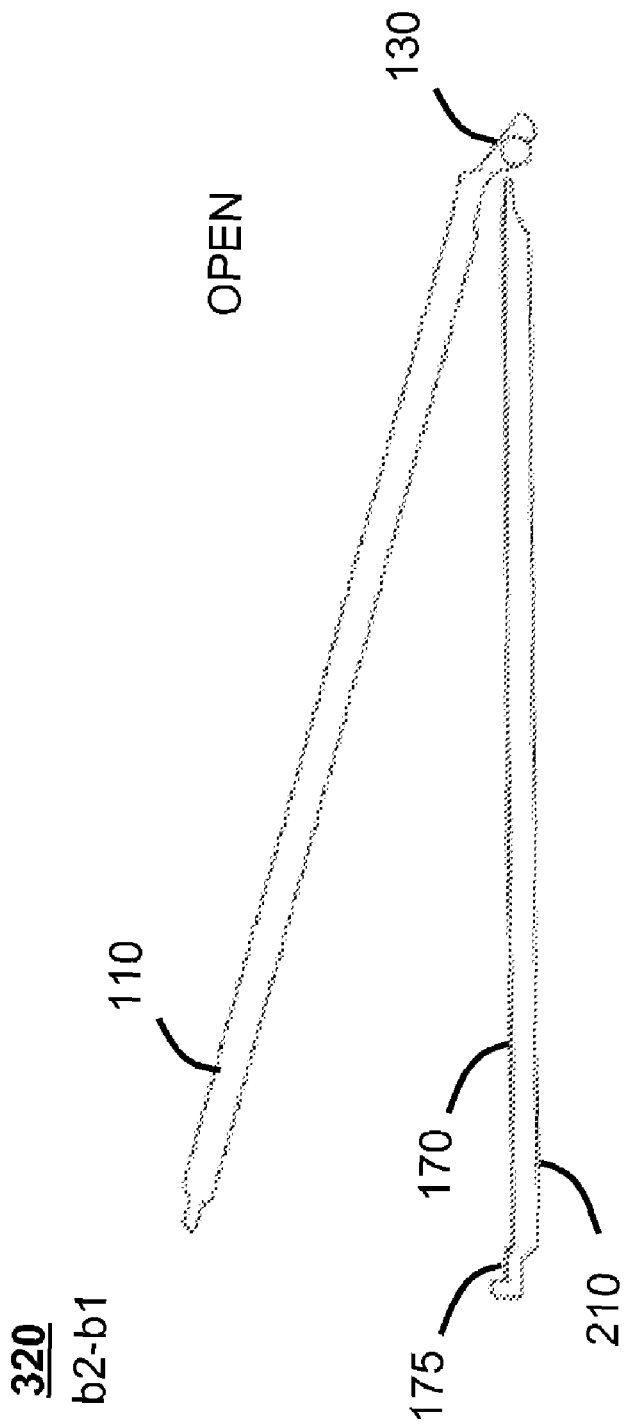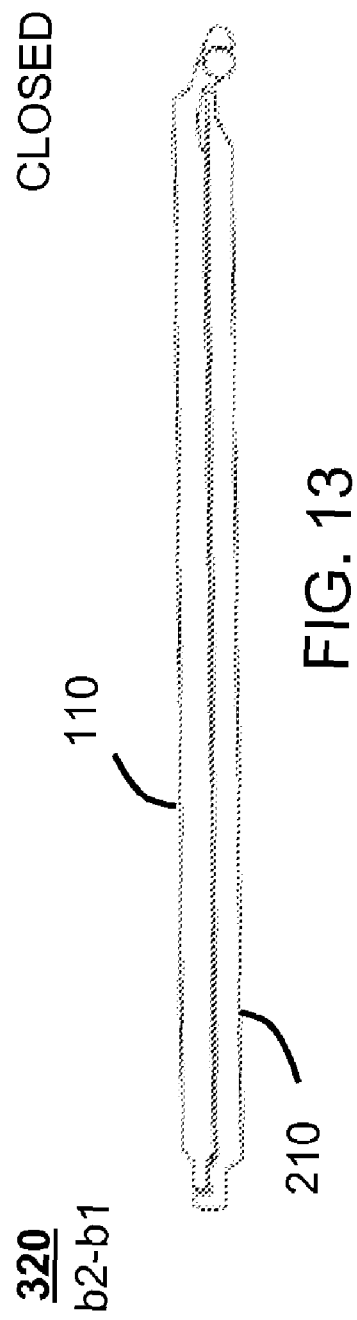

DEVICE FOR SHIELDING READING OF A CONTACTLESS SMARTCARD

CROSS REFERENCE TO RELATED APPLICATIONS

This application is related to, and claims priority in, co-pending U.S. Provisional application Ser. No. 60/806,509 filed on Jul. 3, 2006 and co-pending U.S. Provisional application Ser. No. 60/827,962 filed on Oct. 3, 2006, the disclosures of which are hereby incorporated by reference. This application is also related to co-pending and commonly owned U.S. patent application entitled "Protective Sleeve" filed concurrently herewith, the disclosure of which is hereby incorporated by reference.

FIELD OF THE INVENTION

The present invention relates to radio frequency identification and, more particularly, to devices and methods for protecting information in radio frequency identification systems.

BACKGROUND

Contactless smartcard systems and RFID smartcard systems are employed in a wide range of applications. Contactless smartcards may be credit card sized cards having an embedded microchip that stores data including financial data, health data, and other data, although the smartcards can come in many different sizes and shapes. RFID smartcards may be credit card sized cards having an RFID chip that stores data including financial data, health data, and other data, although the smartcards can come in many different sizes and shapes. Contactless smartcards communicate information wirelessly with a smartcard reader using magnetic, radio frequency (RF), infrared, microwave, light, and/or ultraviolet radiation. For contactless smartcards that use magnetic radiation, RF radiation, or microwave radiation, the smartcards may be read from an owners pocket, wallet, purse or other carrier that is located remote from the smartcard reader. RFID smartcards communicate information wirelessly with a reader using magnetic or radio frequency (RF) radiation that may be read from a owner's pocket, wallet, purse or other carrier that is located remote from the reader As a result, data from contactless smartcards and/or RFID smartcards may be accessed and read without an owners awareness.

Commercially available smartcard readers and/or RFID smartcard readers are designed to read from various different ranges, from distances of an inch or two up to distances of several hundred feet, depending on the strength and frequency of the signals. Readers may be designed with greater magnetic and RF field strength in order to increase an effective range for reading contactless smartcards and/or RFID smartcards. While software encryption technology is available to protect data that is stored on contactless smartcards and/or RFID smartcards, it is possible to compromise the various software encryption techniques. In addition, some smartcards do not include encryption. Other drawbacks exist.

SUMMARY OF THE INVENTION

The embodiments herein presented are provided only for purposes of illustration and as an introduction to the detailed disclosure of the present application. They are not to be considered as limiting the scope of the invention in any manner.

In an exemplary embodiment, a device for preventing reading of a contactless smartcard is provided. The device comprises a first panel sized and shaped for removably receiving and presenting the contactless smartcard; a second panel comprising a shielding material that prevents reading of information from the contactless smartcard when the contactless smartcard is in proximity to the second panel; and a hinge coupling the first panel and the second panel. The hinge keeps the first panel and second panel together in a default configuration for preventing reading. When a force is applied to the hinge the first and second panels are separated for allowing reading of the contactless smartcard.

The first panel can include an angled tab extension that provides leverage for separating the first and second panels upon a force being applied to the angled tab extension. The first panel may include a flange for removably receiving and holding the contactless smartcard. The first panel may have a lipped perimeter that fits in a channeled perimeter of the second panel for selective sealing of the first and second panels. The first panel may have an opening for slidably positioning the contactless smartcard.

The hinge may comprise a spring operatively connected to the first and second panels for keeping the first and second panels together in the default configuration. The hinge may also comprise first and second hinges for providing an opening between the first and second panels for removably receiving the contactless smartcard within the flange. The hinge may include a hook that is an appendage of the first panel or the second panel and a pin that is an appendage of the opposing second panel or the first panel respectively, wherein the hook clips on to the pin such that the panel having the hook appendage pivots on the pin of the opposing panel.

The shielding material may comprise aluminum, stainless steel, radio frequency blocking paper or electromagnetically opaque material. The shielding material may block or attenuate at least one of magnetic signals, radio frequency signals, microwave signals, light, or optical signals. The shielding material may be embedded in the second panel or affixed to the second panel by at least one of glue, heat sealing, heat staking or sonic welding.

In another exemplary embodiment, a method of preventing reading of a contactless smartcard is provided. The method comprises positioning a contactless smartcard in a first position proximate to a shielding material that prevents reading of information from the contactless smartcard. The contactless smartcard may be moved relative to the shielding material to a second position remote from the shielding material. The contactless smartcard can be read when in the second position and the moving of the contactless smartcard relative to the shielding material may be performed with only one hand.

The method also includes preventing intrusive reading of the contactless smartcard from the rear position when the contactless smartcard is in the second position. The method may further comprise using one hand to remove the contactless smartcard from a holding member that is operably connected to the shielding material.

In another exemplary embodiment, a device for shielding a contactless smartcard or an RFID tag from intrusive reading is provided. The device can include a first panel for holding and presenting the contactless smartcard, the first panel having an angled tab extension. A second panel comprising a shielding material that prevents unauthorized reading of information from the contactless smartcard when the contactless smartcard is resting on the second panel, and at least one hinge coupling the first panel and the second panel.

The hinge can keep the first panel and second panel together in a default configuration for preventing unauthorized reading. When a force is applied to the hinge, the first and second panels are separated for allowing reading of the contactless smartcard. The angled tab extension providing leverage for separating the first and second panels when force is applied to the angled extension tab. In one arrangement, the first panel has an opening for slidably positioning the contactless smartcard. The first panel may include a flange for removably receiving and holding the contactless smartcard.

The hinge may comprise a spring operatively connected to the first and second panels for keeping the first and second panels together in the default configuration. The hinge may comprise a first and second hinge for providing an opening between the first and second panels for receiving the contactless smartcard within the flange. The shielding material can comprise aluminum, stainless steel, radio frequency blocking paper or electromagnetically opaque material. The shielding material may block at least one of magnetic signals, radio frequency signals, microwave signals, light or optical signals. The shielding material can operate via various EM shielding techniques such as a faraday's cage or ground plane shielding.

BRIEF DESCRIPTION OF THE DRAWINGS

The features of the system are set forth with particularity in the appended claims. The embodiments herein, can be understood by reference to the following description, taken in conjunction with the accompanying drawings, in the several figures of which like reference numerals identify like elements, and in which:

FIG. 4 is a perspective illustration of the device of FIG. 1 in accordance with the embodiments of the invention;

FIG. 5 is a top view illustration of the device of FIG. 1 in accordance with the embodiments of the invention;

FIG. 6 is an interior cross section view of the device of FIG. 1 in accordance with the embodiments of the invention;

FIG. 7 is an exterior cross section view of the device of FIG. 1 in accordance with the embodiments of the invention;

FIG. 10 is a side view of the interior cross section of FIG. 6 when the device of FIG. 1 is a closed configuration in accordance with the embodiments of the invention;

FIG. 11 is a side view of the interior cross section of FIG. 6 when the device of FIG. 1 is an open configuration in accordance with the embodiments of the invention;

FIG. 12 is a side view of the exterior cross section of FIG. 7 when the device of FIG. 1 is an open configuration in accordance with the embodiments of the invention;

FIG. 13 is a side view of the exterior cross section of FIG. 7 when the device of FIG. 1 is a closed configuration in accordance with the embodiments of the invention;

DETAILED DESCRIPTION OF THE INVENTION

Figure 1A:
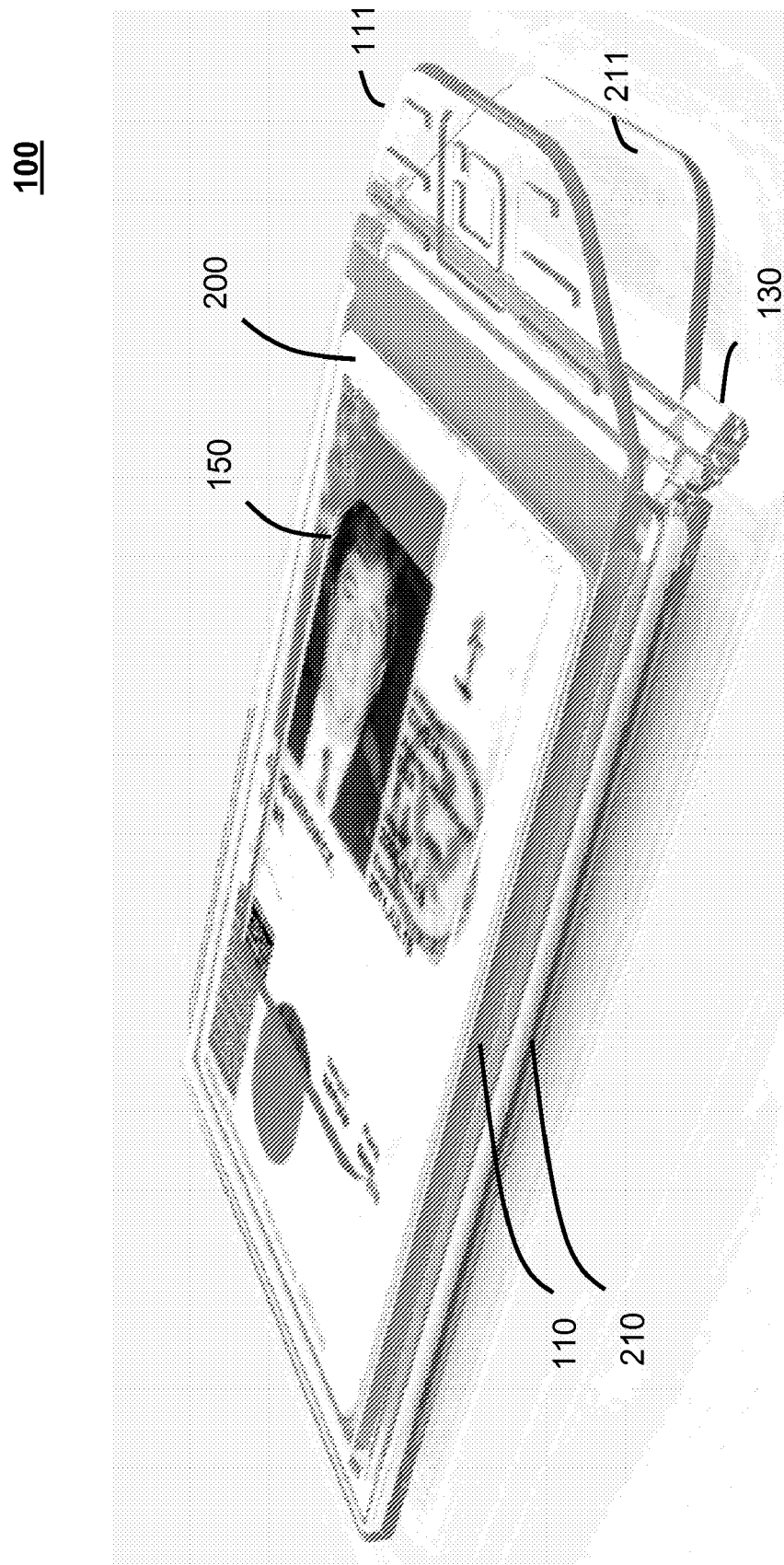
FIG. 1A is a perspective view of a device for shielding a contactless smartcard in accordance with the embodiments of the invention.

While the specification concludes with claims defining the features of the embodiments of the invention that are regarded as novel, it is believed that the method, system, and other embodiments will be better understood from a consideration of the following description in conjunction with the drawing figures, in which like reference numerals are carried forward.

As required, detailed embodiments of the present method and system are disclosed herein. However, it is to be understood that the disclosed embodiments are merely exemplary, which can be embodied in various forms. Therefore, specific structural and functional details disclosed herein are not to be interpreted as limiting, but merely as a basis for the claims and as a representative basis for teaching one skilled in the art to variously employ the embodiments of the present invention in virtually any appropriately detailed structure. Further, the terms and phrases used herein are not intended to be limiting but rather to provide an understandable description of the embodiment herein. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language).

While specific embodiments of the invention are discussed herein and are illustrated in the drawings appended hereto, the invention encompasses a broader spectrum than the specific subject matter described and illustrated. As would be appreciated by those skilled in the art, the embodiments described herein provide but a few examples of the broad scope of the invention. There is no intention to limit the scope of the invention only to the embodiments described.

The invention provides electromagnetic shielding for radio frequency RFID smartcards and/or contactless smartcards. Such shielding can be used to prevent wireless communications with the smartcards, such as in order to prevent unauthorized wireless access to data stored on the smartcards. The present disclosure describes shielding of RFID smartcards. It should be understood that the present disclosure contemplates shielding of other types of electronic devices that are remotely accessible via electromagnetic energy such as RFID tags, as well as shielding of other types of electronic devices. Accordingly, as used herein "contactless smartcards" and "smartcards" include electronic devices that are remotely accessible via electromagnetic energy including, but not limited to, minicards, fobs, credit cards, security identification cards, such as RFID passports, ATM cards, and payment cards, such as those used for public transit, public phones, and electronic toll collection, among others.

Referring to FIG. 1A, a device 100 for shielding a contactless smartcard 200 or RFID smartcard is shown. According to one embodiment, the device 100 may receive a RFID smartcard, contactless smartcard 200, and/or other card-shaped devices having electromagnetic data exchanging capabilities. In practice, the contactless smartcard 200 can be inserted into the device 100, to allow for secure holding of the card. The contactless smartcard 200 may be the size of a credit card that measures approximately 85.6 mm×53.98×0.76 mm, or the contactless smartcard 200 may be the size of a larger identification card that measures approximately 3.4 in.×4.9 in.×0.1 in. Those skilled in the art will appreciate that smartcards having other sizes and configurations are intended to be encompassed by the invention. Regardless of the size and configuration of the smartcard, the shielding device can be dimensioned to securely receive the smartcard.

Figure 1B:
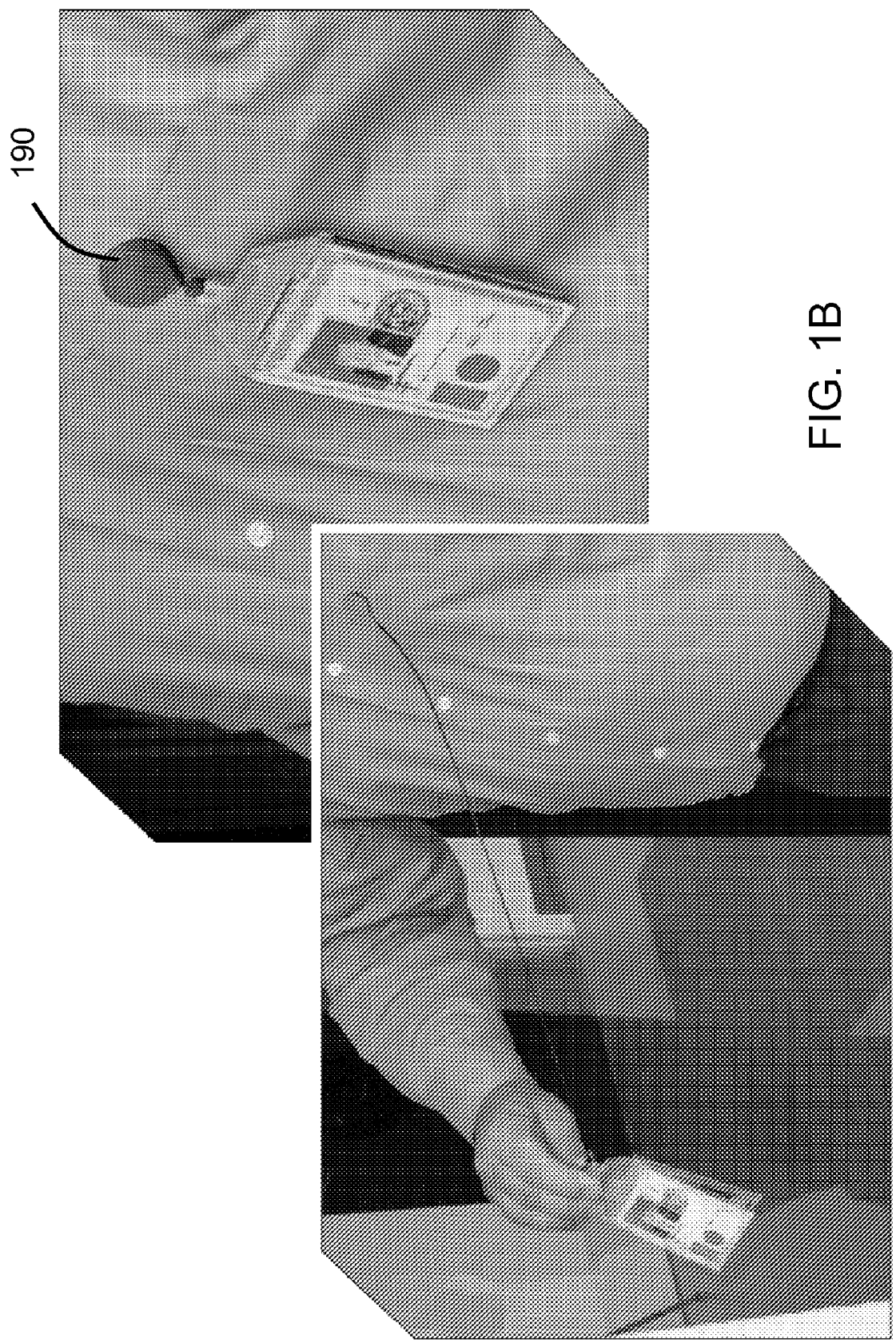
FIG. 1B is an illustration for using the device of FIG. 1A in accordance with the embodiments of the invention.

In one arrangement, the device 100 may serve as a badge for holding an identification card 200. For example, referring to FIG. 1B, the device 100 can include a clip 190 that attaches to the owner for allowing the owner to wear the badge. The clip 190 can include an extension which allows the owner to present the badge without removing the badge. The badge can be retracted via the clip 190 following presentation of the badge.

Briefly, the device 100 can be configured to prevent access to information stored in RFID smartcards, contactless smartcards, RFID passports and/or other wireless devices that are placed in the device 100 at any distance from a reader, including direct contact with a reader. This can be done for various selected frequencies, ranges of frequencies and/or all frequencies. Depending on the materials used to form the device 100, the device may be configured to be a barrier to, or otherwise prevent, one or more selected frequencies, such as 125 kHz, 13.56 MHz, 915 MHz, and/or other frequencies of electromagnetic radiation from accessing RFID smartcards, contactless smartcards, RFID passports and/or other wireless devices that are placed within selected ranges from a reader to direct contact with a reader, blocking or otherwise being a barrier to the near and/or far fields of the selected frequency(ies).

The term "blocking" and/or "barrier" is not intended to be limiting and includes all interaction between the device 100 and the electromagnetic radiation that prevents reading of the smartcard 200. Thus, blocking or being a barrier can include a sufficient reduction of the electromagnetic radiation that reaches the antenna of the smartcard 200 to prevent a readable transmission of data from the smartcard. For example, "blocking" includes both attenuation and reflection so long as there is a sufficient reduction of the electromagnetic radiation that reaches the antenna of the smartcard 200 to prevent a readable transmission of data from the smartcard.

The distance ranges for which device 100 can the frequency of the electromagnetic radiation that is selected, because as the frequency gets higher, the near field becomes larger. The shielding technique used can vary and can include deflection, attenuation, absorption, reflection, and any combination thereof. For example, a faraday's cage can be established to sufficiently surround the contactless smartcard 200 and prevent reading thereof.

A ground plane can also be used so that when the contactless smartcard 200 is in proximity to the ground plane, reading is prevented. In such a ground plane, the E-field tends to hit the conductive ground plane at right angles, rendering it difficult or impossible for the field to induce an electric potential along any conductive paths parallel to the ground plane. Similarly, because an H-field located near a metallic surface tends to have its predominant field component parallel to the surface, it will be unable to induce currents into any cable loop or other conductive path placed close to the ground plane. Keeping the conductive paths as close as possible to a reference ground plane can be an effective way of EM shielding. As will be described later, the smartcard 200 can then be moved a sufficient distance from the ground plane to allow for reading of the smartcard.

Referring back to FIG. 1A, the device 100 can include a first panel or holding member 110 (e.g., a plastic panel) for holding and presenting the contactless smartcard 200, a second panel or shielding member 210 (e.g., a plastic panel) comprising a shielding material that prevents unauthorized reading of information from the contactless smartcard when the contactless smartcard is in proximity to or resting on the second plastic panel, and at least one hinge or other movable connection 130 coupling the first plastic panel 110 and the second plastic panel 210. It should be understood that while the exemplary embodiment described herein has first and second panels 110, 210 that are made from plastic, the present disclosure contemplates the panels being made from materials other than plastic, as well as combinations of materials, such as, for example, being partially made from a plastic and one or more other materials. The hinge 130 can include a spring or other biasing element (not shown) operatively coupled to the first plastic panel 110 and the second plastic panel 210 for keeping the first plastic panel 110 and the second plastic panel 210 together in a default configuration. Accordingly, the hinge keeps the first plastic panel 110 and second plastic panel 210 together in a closed configuration or in close proximity to each other for preventing unauthorized reading. The hinge can be separated when a force is applied for allowing the first plastic panel 110 and the second plastic panel 210 to separate for authorized reading of the contactless smartcard. This particular arrangement allows for operation of the hinge 130 through use of only one hand and preferably through use of only two fingers.

For example, the first plastic panel 110 can include an angled tab extension 111 for providing leverage to separate the first plastic panel 110 and the second plastic panel 210 upon a squeezing of the angled tab extension 111 with a flat tab extension 211 of the second plastic panel. Notably, the angled tab extension 111 is positioned on the first plastic panel 110 holding the contactless smartcard 200. This is an ergonomic feature that facilitates keeping the first plastic panel 110 in place upon depressing the first tab 111 and second tab 211. In practice, when a user squeezes the first tab 111 and the second tab 211, the second plastic panel 210 retracts away from the first plastic panel 110, thereby leaving the first panel in place. For instance, when a user presents the device 100 to a reader (not shown) and squeezes the tabs together, the back portion (e.g. second plastic panel 110) moves away from the front portion (e.g. first plastic panel 110), and the front portion 110 remains in place in front of the reader. A reader is an electronic device or system that can read information stored on the contactless smartcard 200. Of course the movement of the first and second panels 110, 210 is relative to each other and the present disclosure contemplates movement of either or both to achieve the separation. The first and second tabs 111, 211 can have various grips and other structures thereon to facilitate squeezing and provide other functions such as comfort.

The first plastic panel 110, the second plastic panel 210, and the hinge 130 can all be made of the same material, but are not limited to such. For example the material may include polyethylene terephthalate (PET), a polycarbonate blend, a polymer blend, a plastic, or moldable plastics. The components may be made from plastic mold injection or over molds.

Figure 2:
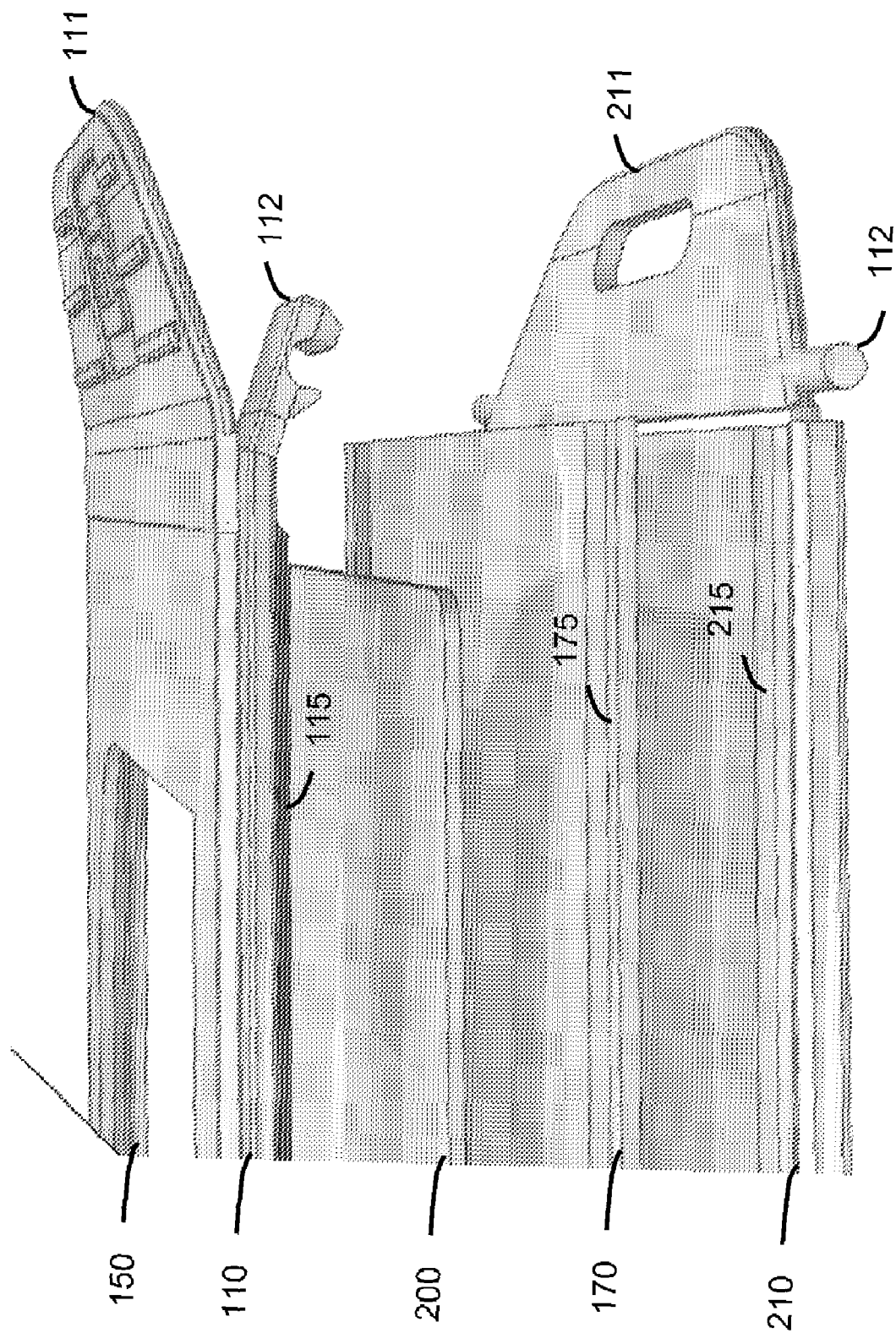
FIG. 2 is an exploded side view of the device of FIG. 1 showing various layers in accordance with the embodiments of the invention.

Referring to FIG. 2, a detailed cross section of the device 100 showing multiple layers is shown. As illustrated, the first plastic panel 110 may include an opening 150 for allowing slidable positioning of the contactless smartcard 200. The first plastic panel 110 may include visually translucent portions, visually transparent portions, or both for viewing a surface of an RFID smartcard and/or contactless smartcard 200 provided therein. The particular size and shape of the opening 150 can be chosen based upon the smartcard that is to be positioned and viewed within the device. Additionally, the opening 150 allows direct and unobstructed viewing and visual reading of the smartcard 200 while the smartcard 200 is disposed within the device 100. Opening 150 allows a user to slide the smartcard 200 out of the device 100 with a single finger such as a thumb which facilitates the use of the device.

The first angled tab 111 is also shown as an extension of the first plastic panel 110. The hinge 130 (see FIG. 1) can comprise a hook 112 that is an appendage of the first plastic panel 110, and a pin 112 that is an appendage of the second plastic panel 210. When connected, the hook 111 clips on to the pin 112 such that the first plastic panel 110 pivots on the pin of the second plastic panel. The second plastic panel 210 can also include the flat tab as an extension for providing leverage over the hinge with the angled tab 111 of the first plastic panel. Although not shown, it should be apparent that the hinge 130 can comprise a hook 112 that is an appendage of the second plastic panel 210, and a pin 112 that is an appendage of the first plastic panel 110. In general, the hook and the pin the form a hinge will be appendages of opposing panels. Of course, the present disclosure contemplates other mechanisms and methods of moveably connecting the first and second panels 110, 210.

The shielding material 170 can be an aluminum, stainless steel, radio frequency blocking paper, or other electromagnetically opaque material. The shielding material may be incorporated into the shielding device in the form of a film, a particle, a fiber, a nonwoven, or any other appropriate form. According to one embodiment, shielding material 170 shields RFID smartcards, contactless smartcards, RFID passports and/or other wireless devices from magnetic and/or electric fields. According to another embodiment of the invention, shielding material 170 protects wireless cards from electromagnetic radiation including magnetic, radio frequency, infrared, microwave, light, ultraviolet and/or other electromagnetic radiation. According to another embodiment of the invention, shielding material 170 may be constructed from metalized polyethylene terephthalate (PET) plastic or another moldable plastic. Another useful shielding material 170 includes EMI shielding material manufactured by Chomerics (a division of Parker Hannifin Corp.), such as the "Premier" and "Win-Shield" shielding materials. The shielding material 170 can be embedded in a thermoplastic compound, for example, a thermoplastic matrix that includes one or more of a shielding material such as carbon fiber, stainless steel fiber or nickel-coated carbon fiber.

The shielding material 170 may be affixed to the second plastic panel 210 using hot, cold and/or physical fastening, such as glue, heat sealing, heat staking, sonic welding, and/or other fastener materials or techniques. Moreover, the first plastic panel 110 may include a lipped perimeter 115 that fits in a channeled perimeter 215 of the second plastic panel 210 for sealing together the first plastic panel and second plastic panel. Accordingly, the shielding material may also include a lipped perimeter 175 for securely fitting the lipped perimeter 115 and the channeled perimeter 215 and keeping the shielding material 170 in place. The lip-channel fitting can provide a sealing mechanism, such as a zip lock seal or other sealing mechanism, for providing water resistance. The second plastic panel 210 may be adapted so as not to include any sharp edges that may damage items, such as clothing, wallets, purses, or other items.

Figure 3:
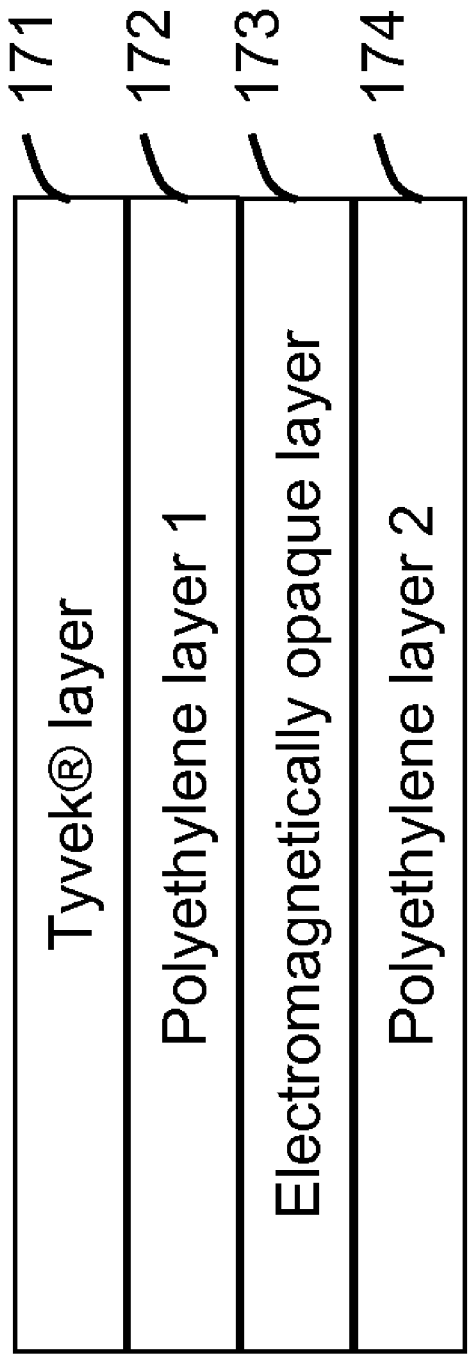
FIG. 3 is a layering for a shielding material in accordance with the embodiments of the invention.

Referring to FIG. 3, the shielding material 170 may also be incorporated into an electromagnetically opaque paper product comprising multiple layers laminated together. According to one embodiment of the invention, the multiple layers may be arranged to include a Tyvek® layer 171, a Polyethylene layer 172, an electromagnetically opaque layer 173, and a second Polyethylene layer 174, among other layers. According to one embodiment, the electromagnetically opaque layer 173 may include aluminum, MuMetal®, Toppan® RF blocking paper, foil, and/or another electromagnetically opaque material. According to another embodiment of the invention, the electromagnetically opaque layer 173 of the shielding material 170 may include any magnetic or electric type shielding material that is laminated to Tyvek® paper.

According to yet another embodiment of the invention, the electromagnetically opaque paper product including the shielding material 170 may or may not include polyethylene. According to another embodiment of the invention, the electromagnetically opaque paper product including the shielding material 170 may be configured to reduce scratching of surfaces of RFID smartcards and/or contactless smartcards placed therein. According to yet another embodiment of the invention, the electromagnetically opaque paper product including the shielding material 170 can be water-resistant and may or may not be waterproof. According to one embodiment of the invention, the electromagnetically opaque paper product of the shielding material 170 may include electromagnetically opaque materials on one side of Tyvek® layer 171 or on both sides of Tyvek® layer 171. According to another embodiment of the invention, Tyvek® layer 171 may be rigid or flexible. According to an alternative embodiment of the invention, the multiple layers may be arranged to include polyethylene layer 172, electromagnetically opaque layer 173, and a second polyethylene layer 174, among other layers, without Tyvek® layer 171. Although Tyvek® is an exemplary paper product layer, other materials are also envisioned, including, but not limited to, paper, spunbond, meltblown, bonded carded webs, metal sheets, films, hydroentangled materials, woven materials, and layered combinations thereof, for example laminates such as spunbond-meltblown-spunbond and spunbond-film.

Referring to FIGS. 4 and 5, a first slice 310 is referenced to show an a1-a2 cross section of an interior portion, and a second slice 320 is referenced to show a b1-b2 cross section of an exterior portion. The device 100 may include a first hinge 321 and a second hinge 322 on the exterior portion. Referring to FIG. 6, the a1-a2 cross section 310 is shown. Referring to FIG. 7, the b1-b2 cross section 320 is shown. In particular, the hinge 130 for the exterior portion is shown, which may or may not extend into the interior portion as shown in FIG. 6. That is, the hinge 130 may be absent in the interior portion.

Figure 8:
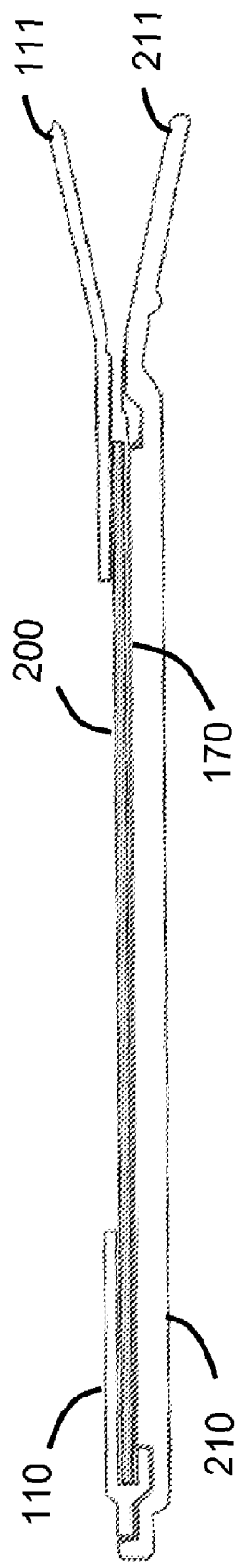
FIG. 8 is an enlarged view of the interior cross section of FIG. 6 in accordance with the embodiments of the invention.

Referring to FIG. 8, an enlarged image of the a1-a2 cross section 310 is shown. In particular, the layers for the first plastic panel 110, the contactless smartcard 200, the shielding material 170, and the second plastic panel 210 are shown. Notably, when in a closed configuration, the contactless smartcard 200 rests against or is in proximity to the shielding material 170 to prevent unauthorized reading. The angled tab 111 and the flat tab 211 are also shown for illustration.

Figure 9:
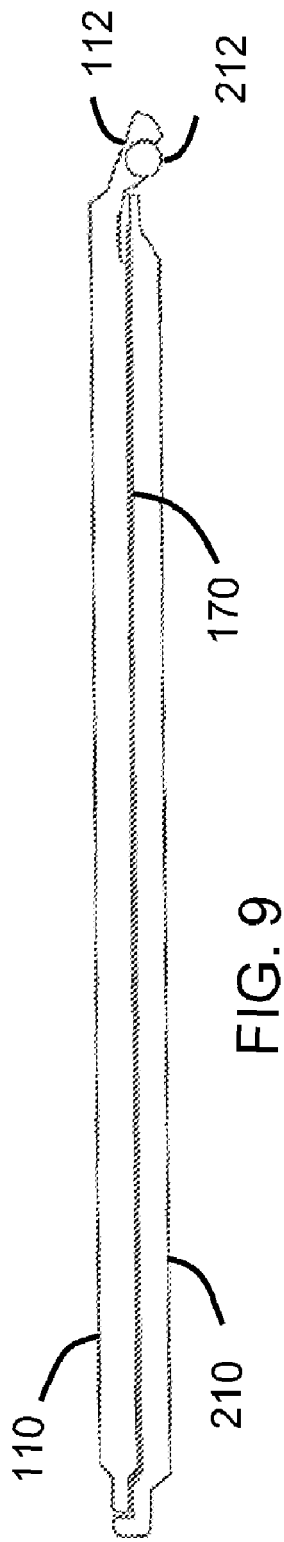
FIG. 9 is an enlarged view of the exterior cross section of FIG. 7 in accordance with the embodiments of the invention.

Referring to FIG. 9, an enlarged image of the b1-b2 cross section 320 is shown. In particular, the layers for the first plastic panel 110, the contactless smartcard 200, the shielding material 170, and the second plastic panel 210 are shown. Notably, when in a closed configuration, the shielding material 170 is in close proximity to the contactless smartcard 200 to prevent unauthorized reading. The present disclosure further contemplates the shielding material 170 surrounding the contactless smartcard 200, either partially or completely, to prevent unauthorized reading. For example, briefly referring back to FIG. 2, the channeled perimeter 175 of the shielding material 170 is sufficiently corrugated for secure placement and to prevent unauthorized reading of the contactless smartcard 200 from the sides. The first hook 112 of the first plastic panel 110 and the first pin of the second plastic panel 212 are also shown for illustration. Notably, the hook 112 and the pin may or may not extend across the entire device 100 as shown in FIG. 8.

Referring to FIG. 10, the a1-a2 cross section 310 of the device in a closed configuration (311) is shown. Notably, the first plastic panel 110 is together with the second plastic panel 210 in a default configuration. Recall, the device 100 may include a spring hinge which keeps sufficient pressure to keep the first plastic panel 110 and second plastic panel 210 in a closed configuration. In the closed configuration, the contactless smartcard 200 can rest against or be in close proximity to the shielding material 170. The shielding material 170 can be an electromagnetically opaque paper affixed to the second plastic panel 210 as previously recited. Accordingly, when the first plastic panel 110 holding the contactless smart card 200 rests against or is in close proximity to the shielding material 170 of the second plastic panel 210, information is blocked from being read. That is, the close proximity or coupling of the contactless smartcard 200 and the shielding material 170 in a closed configuration prevents unauthorized reading of the contactless smartcard 200.

In an alternate configuration, the shielding material 170 may be embedded in the material, e.g. plastic, used to form the second plastic panel 210. In either case, the second plastic panel 210 may serve as a ground plane and prevent contactless smartcard reading devices from accessing the information stored on the smart card with the smart card is in close proximity and parallel to the second plastic panel 210.

However, in an open configuration, the contactless smartcard 200 is sufficiently distant from the shielded material 170 to allow authorized reading. When the user depresses the angled tab 111 and the flat tab 211, the device 100 enters the open configuration by moving the contactless smartcard 200 to a position a sufficient distance from the shielding material 170 to allow reading of the smartcard. In addition, the device pivots such that the smartcard is no longer parallel to the second panel 210. The present disclosure contemplates the movement of the contactless smartcard 200 with respect to the shielding material 170 to be relative, so that the smartcard, shielding material or both may be set in motion. Separation of the contactless smartcard 200 with respect to the shielding material 170 can also include moving the smartcard from a first position of being surrounded, either partially or completely, by the shielding material to a second position of not being surrounded by the shielding material.

Referring to FIG. 11, the a1-a2 cross section 310 of the device 100 in an open configuration (312) for exemplary use is shown. Notably, the first plastic panel 110 is separated from the second plastic panel 210 when the user depresses the angled tab 111 and the flat tab 211 (See FIG. 11). In particular, when the user depresses the angled tab 111 and flat tab 211 for presenting the contactless smartcard 200, the second plastic panel 210 having the shielding material 170 is retracted away from the first plastic panel 110 holding the contactless smartcard 200. In this manner, in an open configuration, the shielding material 170 is no longer resting behind or in close proximity to the contactless smart card 200, and the information can be read by a smartcard reader emitting electromagnetic radiation from in the front of the contactless smartcard 200.

Moreover, the shielding material 170 on the second plastic panel 210 can also blocks radiation, thereby preventing reading from a direction behind the smartcard 200. That is, the coupling of the first plastic panel 110 and the second plastic panel 210 even in an open configuration, can still substantially prevent reading by a smartcard reader emitting electromagnetic radiation from behind the smartcard 200. However, the present disclosure also contemplates movement of the smartcard 200 with respect to the shielding material 170 a sufficient distance so that reading of the smartcard can be done from both a front and rear direction, as well as other directions if desired.

Referring to FIG. 12, an enlarged image of the b1-b2 cross section 320 for an open configuration is shown. In particular, the layers for the first plastic panel 110, the contactless smartcard 200, the shielding material 170, and the second plastic panel 210 are shown. The channeled perimeter 175 (See FIG. 2A) is also shown. Notably, when in an open configuration, the contactless smartcard 200 is retracted away from the shielding material 170 to allow authorized reading. The hinge 130 is also shown which is part of the exterior portion as shown in FIG. 5 and corresponding to the second hinge 322.

Referring to FIG. 13, an enlarged image of the b1-b2 cross section 320 for a closed configuration is shown. In particular, the layers for the first plastic panel 110, the contactless smartcard 200, the shielding material 170, and the second plastic panel 210 are shown. Notably, when in a closed configuration, the shielding material 170 is in close proximity to the contactless smartcard 200 to prevent unauthorized reading. For example, briefly referring back to FIG. 2, the channeled perimeter 175 of the shielding material 170 can be sufficiently corrugated to prevent unauthorized reading of the card from the sides.

Figure 14:
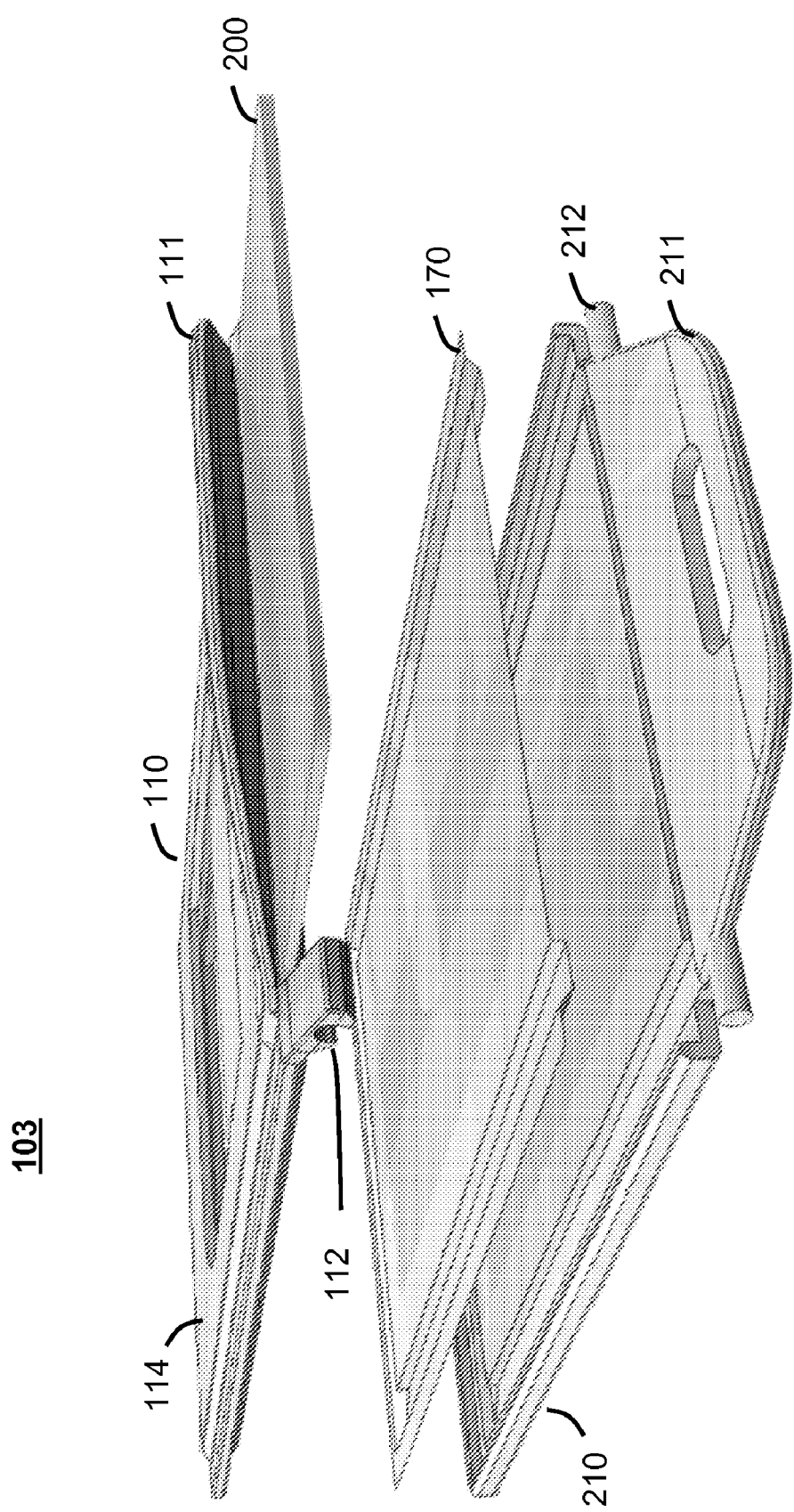
FIG. 14 is a side perspective of the device showing various layers for inserting a contactless smartcard in accordance with the embodiments of the invention.

Referring to FIG. 14 a perspective view of the device 100 of FIG. 1 is shown. In particular, the first plastic panel 110 is shown receiving the contactless smartcard 200. Specifically, the contactless smartcard 200 can be slid into the first plastic panel 110. The first plastic panel 110 includes a flanged portion 114 for receiving and securely holding the contactless smartcard 200. The contactless smartcard 200 can slide into the flanged portion 114 underneath the angled tab 111 of the first plastic panel 110. Notably, the contactless smartcard 200 can be slid into the first plastic panel 110 which does not contain the shielded material 170. Notably, the shielded material 170 is embedded in or affixed to the second plastic panel 210 which is retracted away from the first plastic panel 110 in an open configuration as shown in FIG. 11.

Figure 15:
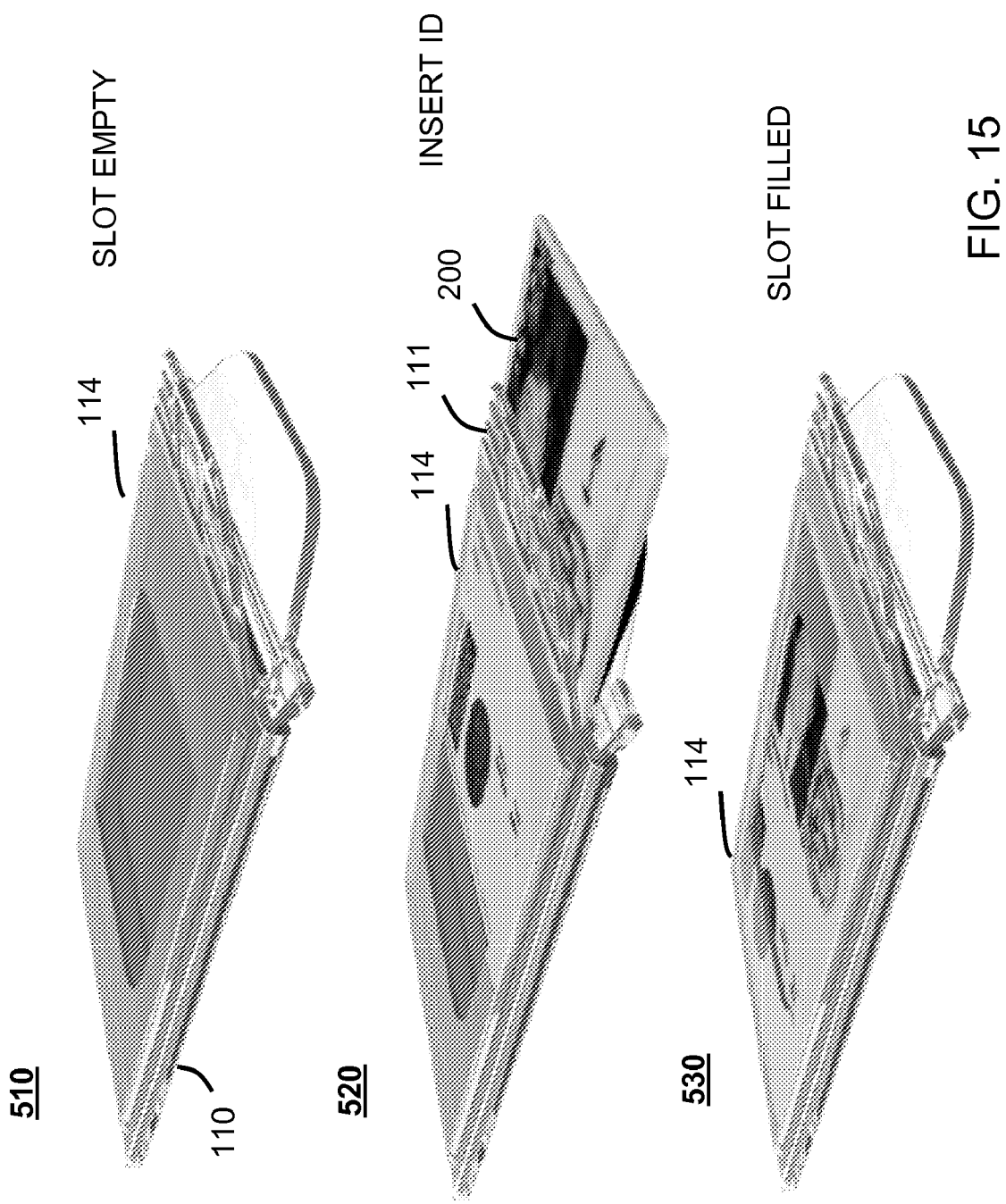
FIG. 15 is an pictorial of visual steps for inserting a contactless smart card in the device of FIG. 1 in accordance with the embodiments of the invention.
Figure 16:
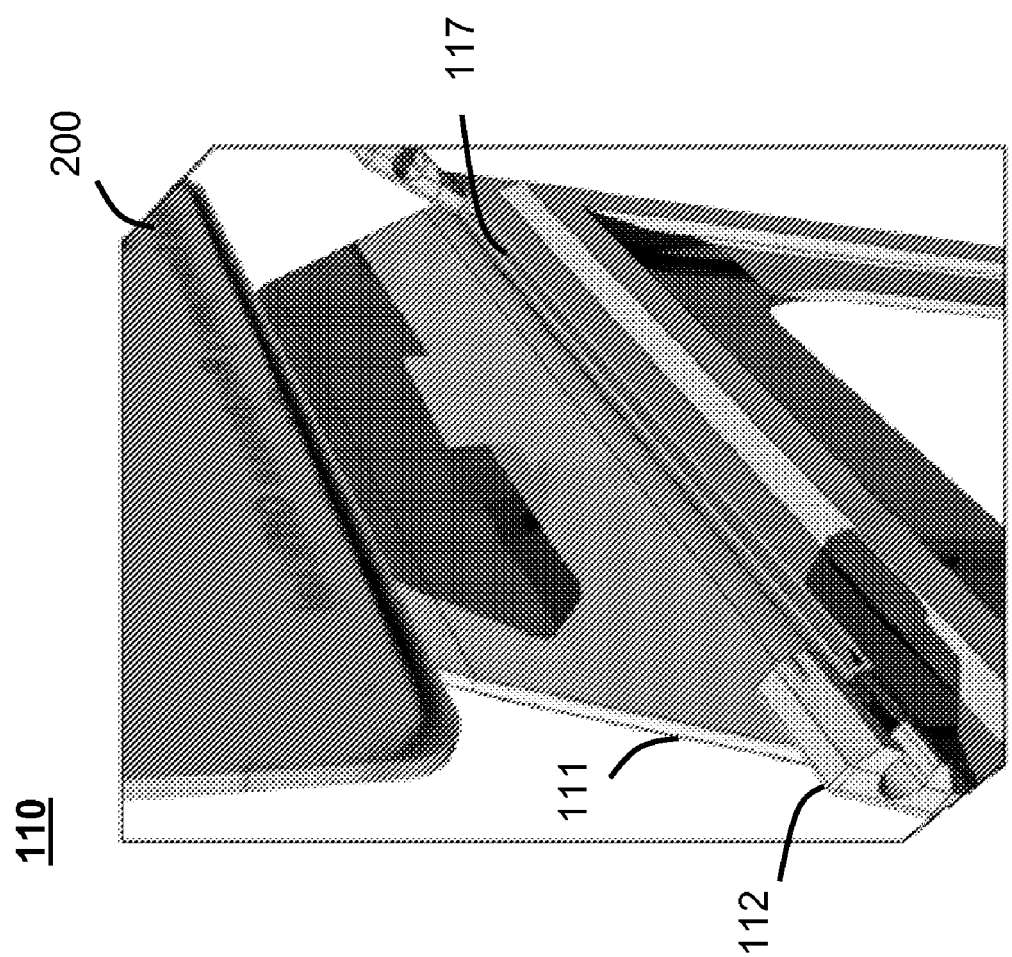
FIG. 16 is a top view perspective for inserting a contactless smart card in the device of FIG. 1 in accordance with the embodiments of the invention.

Referring to FIG. 15, an image sequence for inserting a contactless smart card 200 is shown. In particular, the image sequence illustrates how the smartcard is inserted in the first plastic panel (e.g. top plastic panel). For example, at sequence 510, prior to insertion, the flanged portion 114 of the first plastic panel has an empty slot. At sequence 520, the contactless smartcard 200 can be slid into the flanged portion 114 underneath the angled tab 111. Referring to FIG. 16, an enlarged image of sequence 520 is shown. Notably, the contactless smartcard 200 is inserted through an opening 117 underneath the angled tab 111. Returning back to FIG. 15, at sequence 530, the flanged portion 114 has completely received the contactless smartcard 200. Notably, the contactless smartcard 200 is inserted through the top opening of the device 100. Accordingly, when the device 100 is used as a badge (See FIG. 2), the contactless smartcard 200 cannot slip out of the device 100, as the primary means for removing the contactless smartcard 200 is through the top opening.

Figure 17:
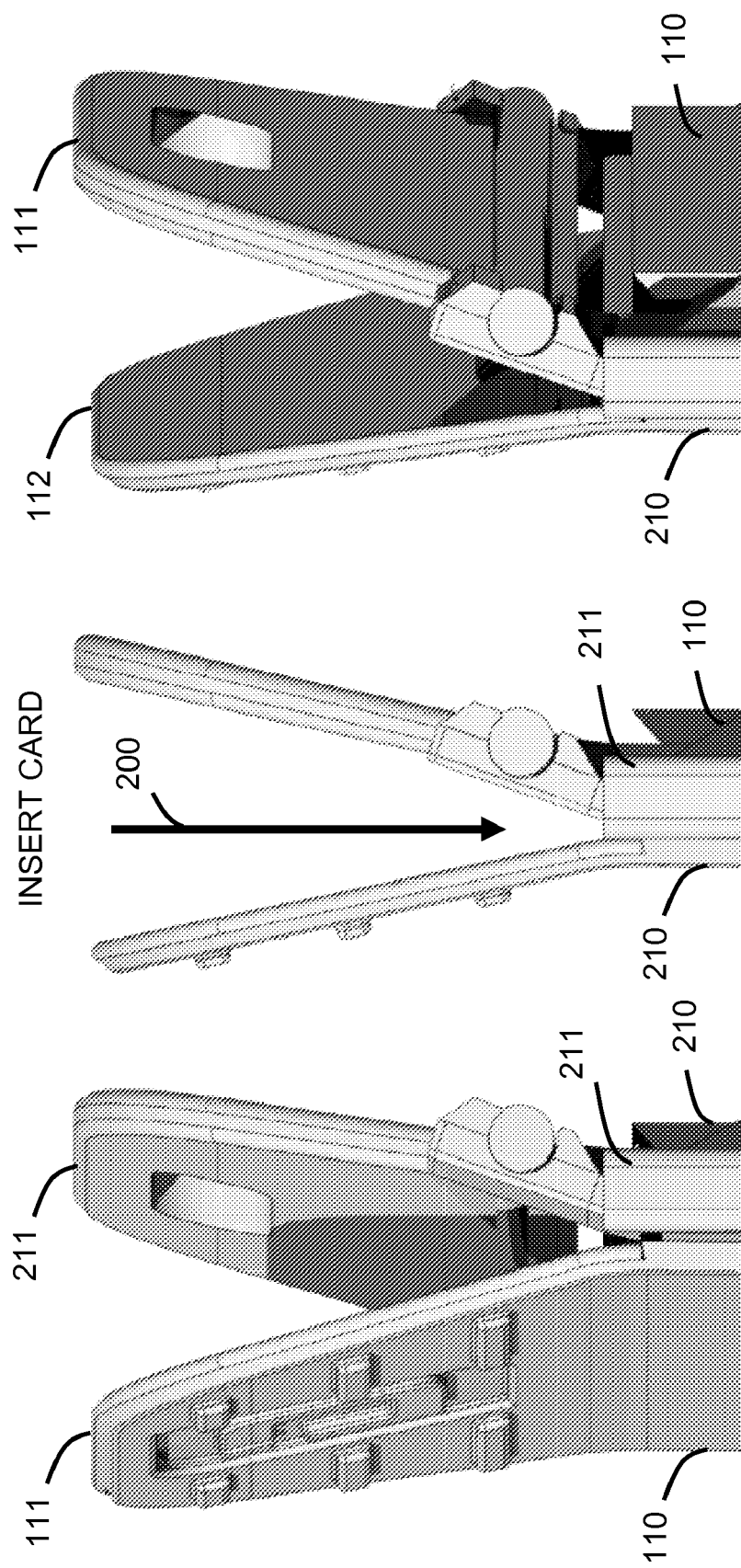
FIG. 17 is an image sequence of the device of FIG. 1 viewed at different angles in accordance with the embodiments of the invention.

Referring to FIG. 17, a side view perspective of the device 100 showing three views is shown. In particular, the side view perspectives illustrate how the contactless smart card 200 can be inserted within the device 100. Notably, the contactless smartcard 200 can be inserted between the angled tab 111 of the first plastic panel 110 and the flat tab 112 of the second plastic panel 210. Various viewing angles are presented for clearly illustrating the insertion of the contactless smartcard 200 in the opening between the first plastic panel 110 and the second plastic panel 210. The side view perspective also shows the border 211 of the second plastic panel 210 which can be made of the same material as the second plastic panel 210.

Figure 18:
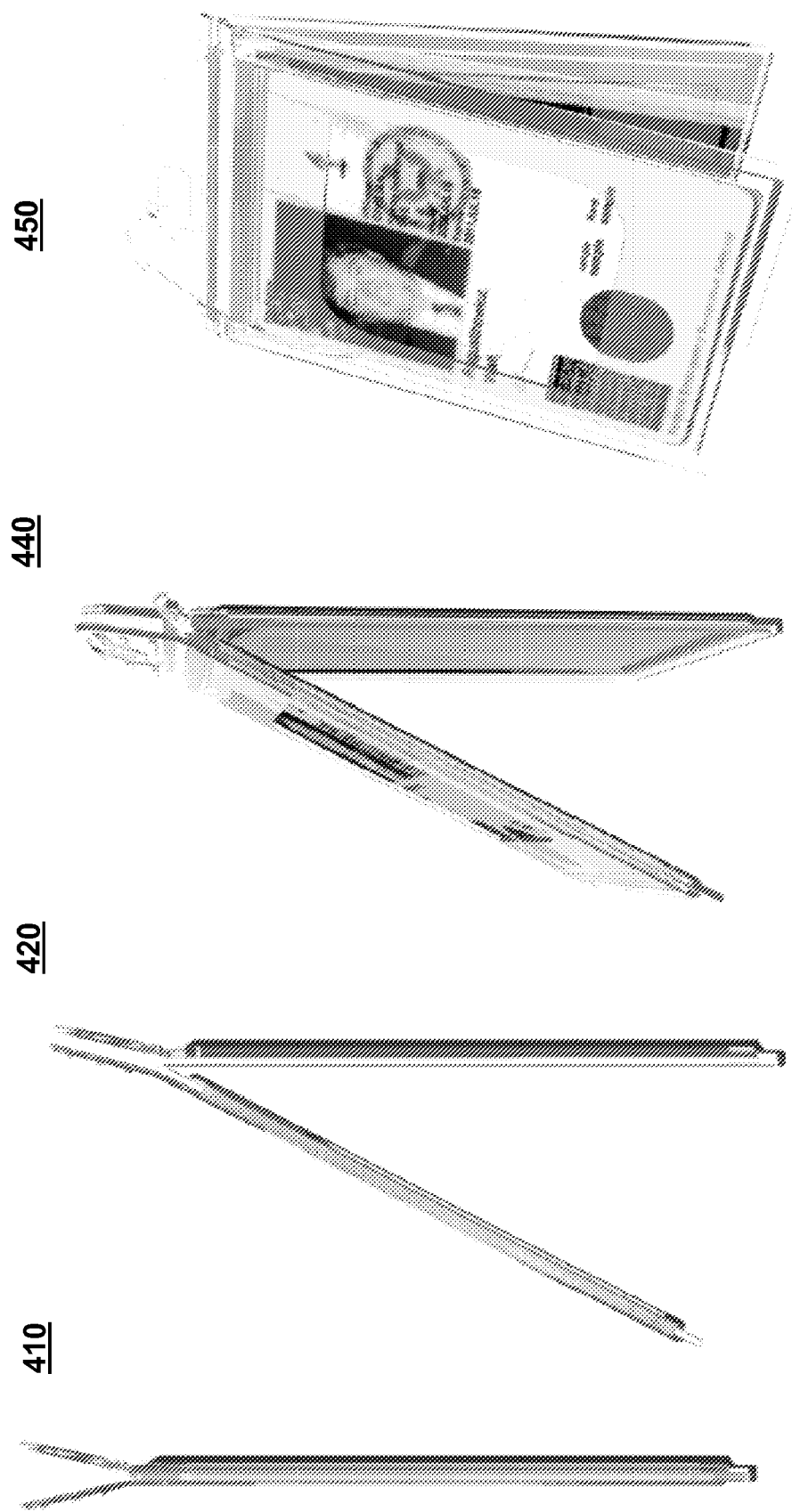
FIG. 18 shows multiple views of the device of FIG. 1 viewed at different angles in accordance with the embodiments of the invention.

Referring to FIG. 18, multiple views of the device 100 suitable for use as a badge are shown. For example, the badge can hold an identification card and prevent unauthorized access. The badge can be worn by a user, who can present the identification card to a reader. For example, referring back to FIG. 2, the user can depress the tabs of the badge to retract the shielding portion for allowing authorized reading of the identification card. Notably, other embodiments of the device 100 are herein contemplated and are not restricted to using the device 100 only as an identification badge. For example, the device 100 may be a clipboard for holding paper forms containing confidential information, a clear plastic box or envelope for holding contactless smartcards, a slim carrying case with a flip top for holding contactless smartcards, or a folding passport containing secure information.

It should be understood that the particular size and shape of the shielding material can be chosen based upon the technique of EM shielding that is being utilized. The particular material can also be chosen based upon the particular EM shielding technique being used. Where ground plane shielding is being utilized the size, shape, material and distance of separation between the contactless smartcard 200 and the shielding material 170 can be chosen to provide an effective shielding of the smartcard from reading of the information thereon.

While preferred forms of the invention have been disclosed, it will be apparent to those skilled in the art that various changes and modifications may be made that will achieve some of the advantages of the invention without departing from the spirit and scope of the invention. Therefore, the scope of the invention will be determined solely by claims that will be added.

We claim:

1. Apparatus for shielding a contactless smartcard, comprising:
    a first panel having opposed first and second ends, a flanged portion formed with a slot, and, an opening located between said first and second ends that borders said slot, the contactless smartcard being insertable into said slot at said first end of said panel and extending to said second end thereof in position so that at least a portion of the contactless smartcard is exposed through said opening, the smartcard being movable into and out of said slot and positionable therein by contact of the smartcard through said opening;
    a second panel including a shielding material;
    a hinge including a first hinging element coupled to said first panel, a second hinging element coupled to said second panel, and a biasing element for urging said first and second hinging elements into a closed position, each of said first and second hinging elements including an outwardly extending tab that are separated from one another to permit the insertion of the smartcard into said slot formed in said flanged portion of said first panel, said hinge being movable between said closed position in which said first and second panels are located in sufficient proximity to one another such that said shielding material of said second panel prevents reading of information on the smartcard, and an open position in which said first and second panels are spaced from one another to permit reading of the information on the smartcard.

2. The device of claim 1, wherein the shielding material comprises aluminum, stainless steel, radio frequency blocking paper, electromagnetically opaque material, electromagnetically reflective material, or an injection molded material capable of blocking or attenuating an electromagnetic signal.

3. The device of claim 1, wherein the shielding material blocks or attenuates at least one of magnetic signals, radio frequency signals, microwave signals, light, or optical signals.

4. The apparatus of claim 1 in which said shielding material is incorporated in a sheet that is affixed to said second panel.

5. The apparatus of claim 1 in which said flanged portion of said first panel is formed with an outwardly extending lip and said second panel has a periphery formed with a channel, said lip being received within said channel with said hinge in said closed position to seal said first and second panels together.

6. The apparatus of claim 1 in which said opening in said first panel permits direct and unobstructed viewing and visual reading of the smartcard.

7. The apparatus of claim 1 in which said hinge is moveable to said open position by grasping said outwardly extending tab on each of said first and second hinging elements and moving them toward one another, said hinge being moveable to said closed position by releasing said outwardly extending tabs.

8. Apparatus for shielding a contactless smartcard, comprising:
    a first panel having opposed first and second ends, a flanged portion formed with a slot, and an outwardly extending lip, and, an opening located between said first and second ends that borders said slot, the contactless smartcard being insertable into said slot at said first end of said panel and extending to said second end thereof in position so that at least a portion of the contactless smartcard is exposed through said opening, the smartcard being movable into and out of said slot and positionable therein by contact of the smartcard through said opening;
    a second panel including a shielding material, said second panel having a periphery formed with a channel;
    a hinge including a first hinging element coupled to said first panel, a second hinging element coupled to said second panel, and a biasing element for urging said first and second hinging elements into said closed position, each of said first and second hinging elements including an outwardly extending tab that are separated from one another to permit insertion of the smartcard into said slot formed in said flanged portion of said first panel, said hinge being movable to said closed position in which said outwardly extending lip of said first panel is inserted into said channel of said second panel and said first and second panels are located in sufficient proximity to one another such that said shielding material of said second panel prevents reading of information on the smartcard, and said hinge being moveable to an open position in which said first and second panels are spaced from one another to disengage said lip from said channel and to permit reading of the information on the smartcard.

9. The apparatus of claim 8 in which said shielding material is incorporated in a sheet having a periphery formed with a channel, said sheet being affixed to said second panel in position wherein said channel of said sheet rests within said channel of said second panel, said lip of said first panel being received within said channel of said sheet.

10. The apparatus of claim 8 in which said opening in said first panel permits direct and unobstructed viewing and visual reading of the smartcard.

11. The apparatus of claim 8 in which said hinge is moveable to said open position by grasping said outwardly extending tab on each of said first and second hinging elements and moving them toward one another, said hinge being moveable to said closed position by releasing said outwardly extending tabs.

* * * * *